United States Patent
Provost et al.

(10) Patent No.: US 7,006,751 B2
(45) Date of Patent: Feb. 28, 2006

(54) OPTICAL FIBER FOR AMPLIFICATION OR FOR LASER EMISSION

(75) Inventors: Lionel Provost, Marcoussis (FR); Gilles Melin, Orsay (FR); Andre Le Sauze, Bures sur Yvette (FR); Anne Fleureau, Loing (FR); Christian Simonneau, Antony (FR); Xavier Rejeaunier, Mandelieu la Napole (FR)

(73) Assignee: Draka Comteo, (NL)

( * ) Notice: Subject to any disclaimer, the term of this patent is extended or adjusted under 35 U.S.C. 154(b) by 0 days.

(21) Appl. No.: 10/853,134

(22) Filed: May 26, 2004

(65) Prior Publication Data
US 2005/0163449 A1    Jul. 28, 2005

(30) Foreign Application Priority Data
May 27, 2003   (FR)   .................................. 03 06386

(51) Int. Cl.
*G02B 6/00*   (2006.01)
(52) U.S. Cl. ............................. 385/141; 385/124; 372/6
(58) Field of Classification Search ........ 385/123–128, 385/141–145; 372/6, 70–72
See application file for complete search history.

(56) References Cited

U.S. PATENT DOCUMENTS 4,465,334 A    8/1984   Siemsen et al. ............ 385/127
5,907,652 A *  5/1999   DiGiovanni et al. ........ 385/125
6,480,659 B1   11/2002  Patlakh et al. .............. 385/125

FOREIGN PATENT DOCUMENTS

EP    0 905 834 B      3/2001
WO    WO 03 019257 A   3/2003

OTHER PUBLICATIONS

J. Sahu et al, "Jacketed air-clad cladding pumped ytterbium-doped fiber laser with wide tuning range", Electronics Letters, IEE Stevenage, GB< vol. 37, No. 18, Aug. 30, 2001, pp. 1116-1117, XP0006017185.

B. J. Eggleton et al, Cladding-Mode-Resonances in Air-Silica Microstructure Optical Fibers, Journal of Lightwave Technology, IEEE, New York, US, vol. 18, No. 8 Aug. 2000, pp. 1084-1100, XP000989386.

* cited by examiner

*Primary Examiner*—Phan T. H. Palmer
(74) *Attorney, Agent, or Firm*—Sughrue Mion, PLLC

(57) ABSTRACT

The invention relates to the field of amplifying or emitting optical fibers. It comprises an amplifying optical fiber doped with a rare earth comprising a plurality of successive segments (1, 2, 3, 4, 5), presenting a monomode core and a multimode core, presenting at the periphery of the multimode core a peripheral segment (4) of low index so as to increase the numerical aperture of the optical fiber, outer cladding (5) being situated at the periphery of the low index peripheral segment (4), the multimode core being at least in part above the outer cladding (5), the peripheral segment (2) presenting a decreasing gradient shape.

34 Claims, 3 Drawing Sheets

OPTICAL FIBER FOR AMPLIFICATION OR FOR LASER EMISSION

The invention relates to that field of optical fibers for amplification or for laser emission, i.e. amplifying optical fibers or laser-emitting optical fibers.

An amplifying optical fiber transforms light energy at a pump wavelength into light energy at signal wavelengths over a band that is relatively broad, for example typically several tens of nanometers. Below, mention is sometimes made more simply of the "signal wave". Both the pump wave and the signal wave propagate longitudinally in the amplifying optical fiber. A portion of the amplifying optical fiber is doped with a rare earth. By way of example, the rare earth contains erbium which is advantageously associated with aluminum, for example. It is the interaction between the doped zone and the light energy at the pump wavelength that enables the signal in the signal wavelength band to be amplified. It is this interaction which needs to be enhanced in order to improve the efficiency of an amplifying optical fiber.

An emitting optical fiber transforms light energy at a pump wavelength into light energy in a signal wavelength band that is relatively narrow, e.g. typically a few nanometers. Below, mention is sometimes made more simply of the "signal wave". The pump wave and the signal wave both propagate longitudinally in the emitting optical fiber. A portion of the emitting optical fiber is doped with a rare earth. The rare earth contains, for example, ytterbium. It is the interaction between the doped zone and the light energy at the pump wavelength that enables the signal to be created in a signal wavelength band using the light energy at the pump wavelength. It is this interaction that needs to be enhanced in order to improve the efficiency of the emitting optical fiber. In the text below, except where mentioned to the contrary, reference is made to an amplifying optical fiber, however anything which applies to an amplifying optical fiber also applies to an emitting optical fiber.

In first prior art, it is known to use an amplifying optical fiber having a core that is multimode at the pump wavelength, the core presenting a polygonal shape in a section plane perpendicular to the longitudinal axis of the amplifying optical fiber so as to break the radial symmetry of the amplifying optical fiber, causing the guided modes to pass more often through the zone doped with the rare earth. A drawback of that prior art is that it is complex and expensive to make. Furthermore, that prior art has the drawback of allowing only a small number of modes to be used for performing pumping in the amplifying optical fiber.

In second prior art, e.g. as disclosed in U.S. Pat. No. 5,907,652, it is known to use a peripheral segment located at the periphery of the core that is multimode at the pump wavelength, which peripheral segment is essentially constituted by air cavities separated from one another by walls of silica. The effective refractive index of the peripheral segment is very low, so the numerical aperture of the amplifying optical fiber becomes very high, and consequently the number of modes that are usable at the pump wavelength for performing pumping increases greatly. A drawback of that prior art is that it does not make best use of all of the modes available for performing pumping, in the sense that a large number of the modes injected into the amplifying optical fiber for performing pumping pass relatively rarely through the zone that is doped with the rare earth, particularly since the doped zone is localized in the center of the optical fiber, with said modes that pass relatively rarely through the doped zone contributing little to pumping and therefore being used little.

The amplifying optical fiber of the second prior art is shown in accompanying FIG. 1A in cross-section relative to the longitudinal axis of the optical fiber, and in accompanying FIG. 1B it is shown in the form of an index profile plotted as a function of distance from the center of the optical fiber. In FIG. 1A, the amplifying optical fiber comprises, from the center of the optical fiber towards its periphery, a core 1 that is monomode over the signal wavelength band, the major portion 2 of a core that is multimode at the pump wavelength, the multimode core also including the monomode core 1, a peripheral segment 4 essentially constituted by air cavities 41 separated from one another by silica walls 42, and outer cladding 5. In FIG. 1B, the effective index profile $n_{\mathit{eff}}$ of the optical fiber is plotted as a function of radius r expressed in micrometers ($\mu$m), abscissa point 0 representing the center of the optical fiber. From the center of the optical fiber out to radius $r_1$, there extends the monomode core 1 of constant index $n_1$. Between radius $r_1$ and radius $r_2$ there extends the major portion 2 of the multimode core presenting a constant index $n_2$, the multimode core itself extending from the center of the optical fiber out to radius $r_2$. Between radius $r_2$ and radius $r_4$ there extends the peripheral segment that is essentially constituted by air cavities, said peripheral segment 4 presenting a constant index $n_4$. Between radius $r_4$ and a radius $r_5$ (not shown in FIG. 1B), there extends the outer cladding 5 of constant index $n_5$. The indices $n_2$ and $n_5$ are equal.

This second type of prior art is also to be found with variants in the following documents: international patent application WO 01/42829, European patent application EP 1 199 581, U.S. Pat. No. 6,480,659, international patent application WO 02/078138, U.S. patent application No. 2002/0197039, and European patent application EP 1 241 491.

The present invention can be seen as an improvement to the second prior art. As in the second prior art, the optical fiber of the invention increases the number of modes available for performing pumping by reducing the index of a peripheral segment situated at the periphery of the multimode core. Unlike the second prior art, the optical fiber of the invention improves the efficiency of the modes used for performing pumping by increasing overlap between said modes and the zone that is doped with the rare earth so as to improve the absorption of light energy at the pump wavelength by the amplifying optical fiber. For this purpose, the index of at least a portion of the multimode core is in the form of a gradient that decreases from the center of the optical fiber towards its periphery so as to recenter said modes, i.e. so as to recenter their energy. In addition, in order to use said modes even more efficiently, losses by leakage from said modes are reduced for certain modes and are even eliminated for other modes by virtue of the index level of the majority of the multimode core which lies above the index level of the outer cladding. The modes whose leakage losses are eliminated are referred to as "guided modes". The multimode core of outside radius in a section plane extending transversely to the axis of the optical fiber is substantially circular and is much simpler and nearly as efficient as that of the first prior art for improving overlap between the modes used for pumping and the zone doped with the rare earth. The outside radius of the monomode core is likewise substantially circular. The relationship $n_1 > n_2 > n_5$ is obtained by differences in doping between the segments, unlike the minimum effective index difference $n_4$ which is obtained by using air cavities or cavities of other materials having very low index.

The invention provides an optical fiber, doped at least in part with a rare earth so as to be capable of transforming light energy at a pump wavelength into light energy over a signal wavelength band that does not include the pump wavelength, comprising in succession, from the center of the optical fiber towards its periphery: a central segment (1) of maximum index $n_1$ and of radius $r_1$; a peripheral segment (2) of maximum index $n_2$ and of radius $r_2$; a peripheral segment (4) of minimum effective index $n_4$ and of radius $r_4$; and a peripheral segment (5) of maximum index $n_5$ and of radius $r_5$; where $n_1 > n_2 > n_4$ and $n_5 > n_4$ and $r_1 < r_2 < n_4 < r_5$, the indices and the radii being determined in such a manner that: firstly, over the signal wavelength band, the optical fiber presents a monomode core extending from the center of the optical fiber to radius $r_1$; and secondly at the pump wavelength, the optical fiber presents a multimode core extending from the center of the optical fiber to radius $r_2$; the minimum effective index $n_4$ being small enough to ensure that the numerical aperture of the optical fiber at the pump wavelength is greater than 0.25, the optical fiber being characterized in that $n_2 > n_5$; and in that the peripheral segment (2) of maximum index $n_2$ presents a decreasing graded shape so as to recenter the light energy of at least some of the guided modes at the pump wavelength so as to increase overlap between said recentered guided modes and the portion (6) of the optical fiber which is doped with the rare earth.

The invention will be better understood and other features and advantages will appear on reading the following description made with reference to the accompanying drawings given as examples, in which.

An amplifying optical fiber is the seat of longitudinal pumping, transforming energy at a pump wavelength into energy over a signal wavelength band. Preferably, the pump wavelength is about 980 nanometers (nm). In a first application where the optical fiber is an amplifying fiber, the signal wavelength band extends from 1460 nm to 1650 nm. The rare earth preferably then contains erbium. In a second application, where the optical fiber is a laser emitter, the signal wavelength band includes 1060 nm. The rare earth then preferably contains ytterbium.

Returning to the context of the first application, the rare earth, preferably erbium, is disposed in a portion of the amplifying optical fiber. Preferably, rare earth doping extends over the portion situated inside the peripheral segment of minimum index $n_2$ but outside the central segment of maximum index $n_1$. The rare earth is disposed at least in the multimode core, preferably at least in part outside the monomode core. The rare earth may also be disposed in part in the monomode core or indeed solely in the monomode core as in the second prior art, but advantageously the monomode core does not contain the rare earth so as to prevent the rare earth from reabsorbing light energy in the signal wavelength band to too great an extent, thereby further improving the efficiency of pumping by reducing losses. Preferably, only a ring situated in the multimode core immediately outside and in contact with the monomode core contains the rare earth. This ring is situated immediately outside and in contact with the central segment. In the index profile of the amplifying optical fiber of the invention, this ring advantageously corresponds to a horizontal level situated between the central segment and the peripheral segment in the form of a decreasing gradient with a maximum index $n_2$. Preferably, the portion of the optical fiber which is doped with the rare earth extends at least from 3.5 μm to 5.5 μm starting from the center of the optical fiber, said portion extending, for example, typically from 3 μm to 6 μm.

Figure 2A:
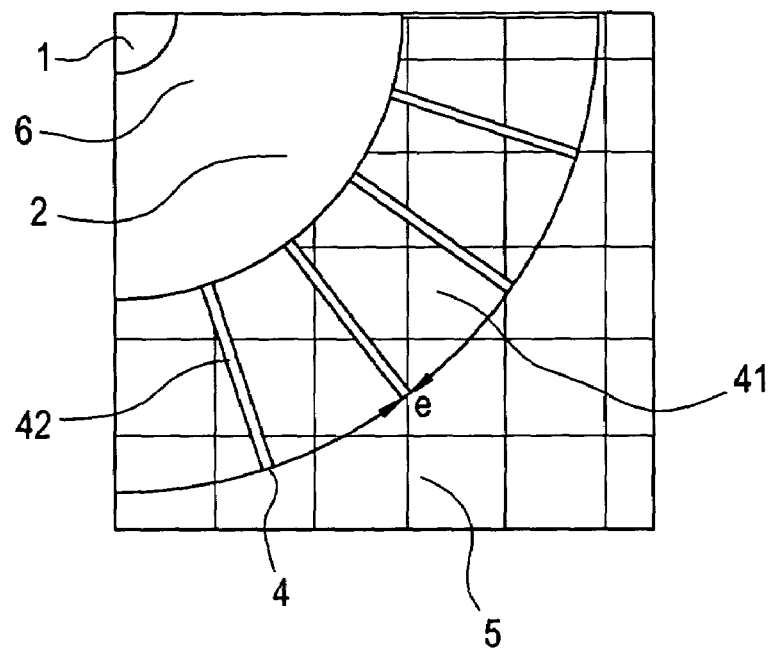
FIG. 2A is a diagrammatic view in section across the axis of the optical fiber, showing an example of a first embodiment of an amplifying optical fiber of the invention.

FIG. 2A is a diagrammatic view in section across the axis of the optical fiber, showing a first embodiment of an amplifying optical fiber of the invention. For reasons of clarity, FIG. 2A shows only one-fourth of the section view, the amplifying optical fiber comprising, from the center of the optical fiber towards its periphery: a core 1 that is monomode over the signal wavelength band; a ring 6 doped with the rare earth; the major portion 2 of a core that is multimode at the pump wavelength, the multimode core also covers the monomode core 1 and the ring 6; a peripheral segment 4 essentially constituted by air cavities 41 separated from one another by walls 42 of silica; and outer cladding 5. The walls 42 are preferably of thickness e that is radially constant over at least a given length of radius, i.e. constant along a radius connecting the center of the optical fiber to its periphery, at least over a substantial fraction of the wall, i.e. over the entire wall except at its ends situated at the interface between the peripheral segment 4 and the other segments, or at the interface between the air cavity layers if there are several such layers. Reference is made below more simply to thickness that is radially constant.

Figure 1A:
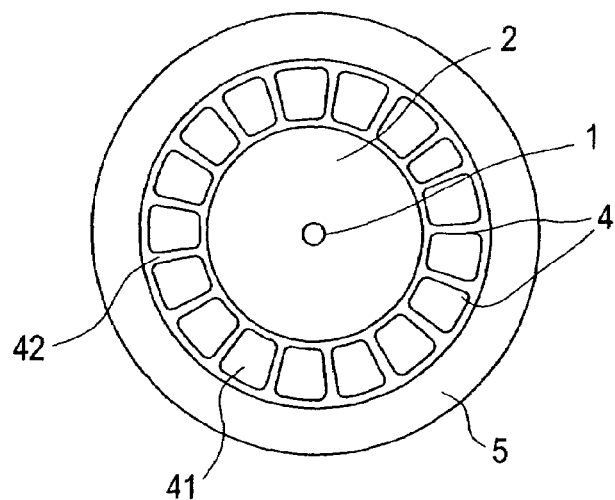
FIG. 1A is a diagrammatic view in section across the axis of the optical fiber, showing an amplifying optical fiber of the second prior art.
Figure 1B:
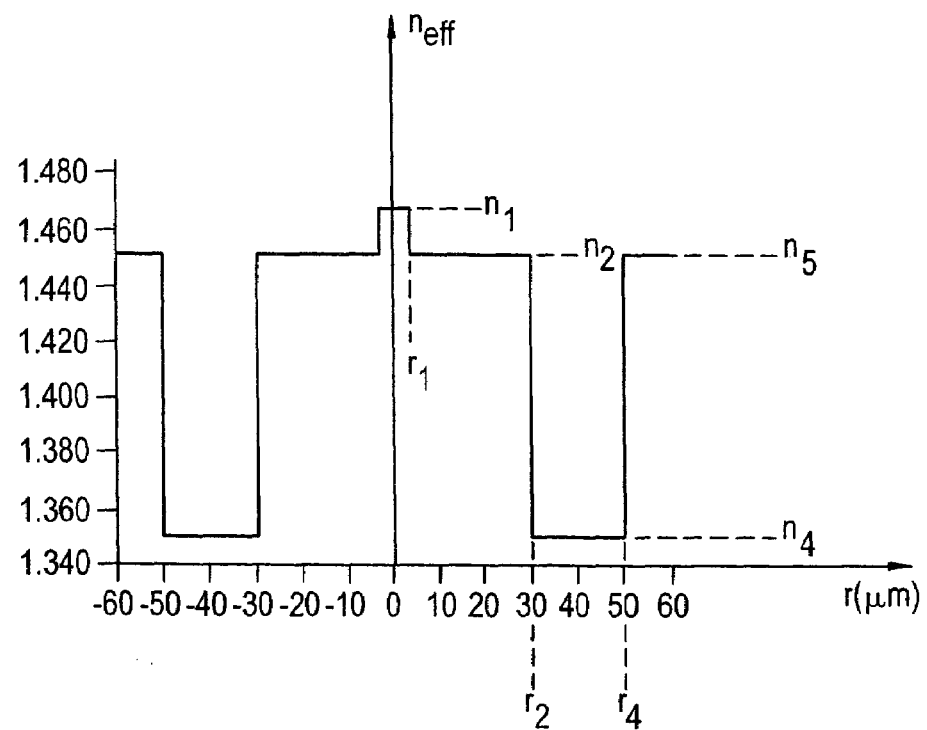
FIG. 1B is a diagram showing the index profile of an amplifying optical fiber of the second prior art.
Figure 2B:
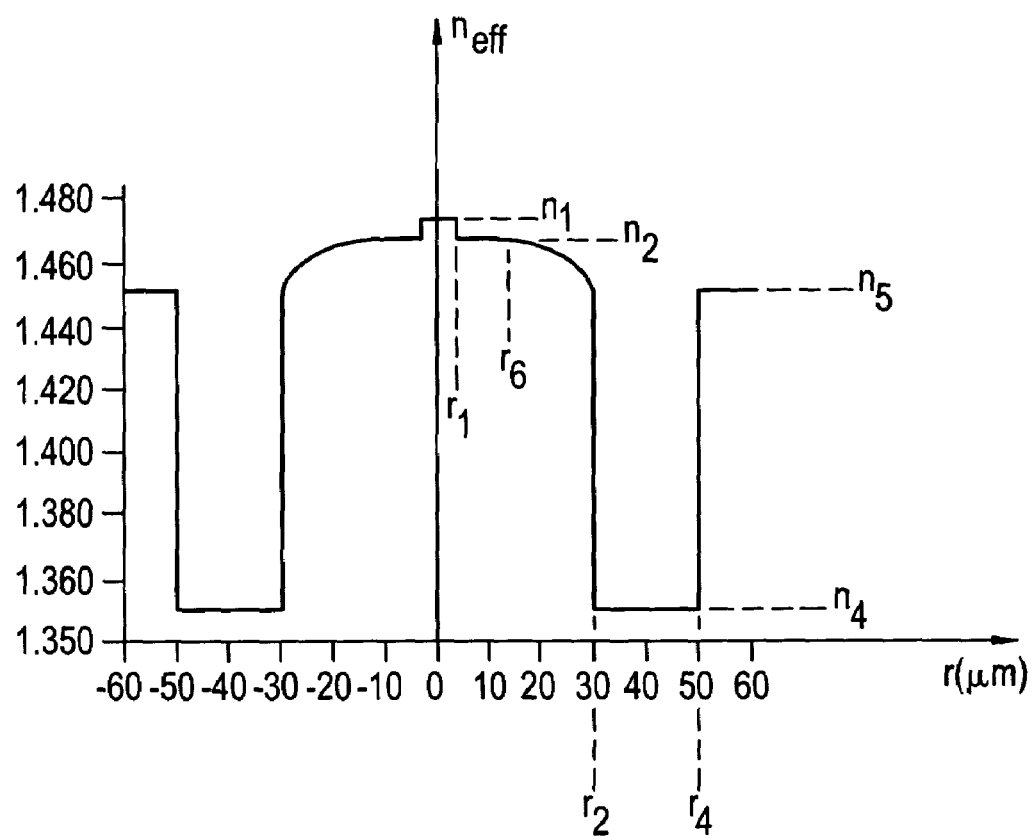
FIG. 2B is a diagram showing an example of the index fiber in a first embodiment of an amplifying optical fiber of the invention.

FIG. 2B is a diagram showing an example of index profile in a first embodiment of an amplifying optical fiber of the invention. In FIG. 2B, the effective index profile $n_{eff}$ of the optical fiber is plotted as a function of radius r expressed in μm, abscissa point 0 representing the center of the optical fiber. From the center of the optical fiber out to radius $r_1$, there extends the monomode core 1 of constant index $n_1$. From radius $r_1$ to radius $r_6$ there extends the ring 6 that is doped with rare earth and that presents a constant index $n_2$ equal to the maximum index $n_2$ of the peripheral segment 2 whose index forms a decreasing graded shape. Between radius $r_6$ and radius $r_2$, there extends the major portion 2 of the multimode core that begins with a maximum index $n_2$ and presents an index having a decreasing graded shape, the multimode core extending from the center of the optical fiber out to radius $r_2$. Between radius $r_2$ and radius $r_4$ there extends the peripheral segment 4 that is essentially constituted by air cavities, said peripheral segment 4 presenting a constant index $n_4$. Between radius $r_4$ and radius $r_5$ (not shown in FIG. 1B), there extends the outer cladding 5 of constant index $n_5$. The maximum index $n_2$ is greater than the index $n_5$. The entire peripheral segment 2 presents an index greater than the index $n_5$.

The peripheral segment 2 presents a decreasing gradient shape, i.e. an index profile in the form of a decreasing gradient. This decreasing gradient is preferably continuous and slopes gently. The peripheral segment 2 preferably presents a shape in α. The index profile n(r) satisfies the following conventional equation:

$$n(r) = n_{max} \cdot \left(1 - 2 \cdot \Delta \cdot \left(\frac{r - r_{min}}{r_{max} - r_{min}}\right)^\alpha\right)^{\frac{1}{2}}$$

where n(r) represents the value of the index profile as a function of radius; $n_{max}$ represents the maximum index $n_2$ of the segment 2; $r_{min}$ and $r_{max}$ represent respectively the beginning and the end of the segment 2; and Δ represents the variation in index between the beginning and the end of the segment 2. α=1 corresponds to a triangular shape. α=2 corresponds to a parabolic shape. α=∞ corresponds to a rectangular shape. This shape in α is preferably not too small since the number of modes decreases, and not too great since otherwise the recentering of the modes contributing to pumping is less effective. Preferably, the peripheral segment of maximum index $n_2$ presents a shape in α, with α<5. Preferably, the peripheral segment of maximum index $n_2$ presents a shape in α with α>2. Advantageously, the peripheral segment of maximum index $n_2$ presents a shape in α, with α being equal to about 3, i.e. lying in the range 2.5 to 3.5. For example if it has a shape in α with α equal to 3, the overlap between the recentered modes and the ring doped with rare earth is considerably better than is the case in the second prior art. There is a match between the modes presenting the best overlap with the ring doped with the rare earth and the modes which are best guided in the optical fiber, i.e. the modes which propagate best along said optical fiber. It is advantageous for these modes which are best at propagating in the optical fiber also to be the modes which are the most efficient in performing pumping because of their high degree of overlap with the ring doped with the rare earth.

The way in which the air cavities are made consists, for example, in assembling cavities and/or tubes containing air on a conventional preform. The resulting complex preform can then be drawn into a fiber. The main advantage of large air cavities is a great reduction in the index of the peripheral segment 4 so as to greatly increase the numerical aperture of the optical fiber at the pump wavelength so that the number of modes contributing to pumping can become very high. Preferably, in order to obtain this low index, the peripheral segment 4 of minimum effective index $n_4$ includes air cavities 41 separated from one another by walls 42 and occupying the major fraction of said peripheral segment 4 of minimum effective index $n_4$. Materials other than air and also presenting an index that is relatively low could also be used, however air is inexpensive and presents an index that is very low, so it is particularly advantageous. The multimode core that is of index greater than that of the outer cladding 5 prevents leakage of the guided modes that contribute most to pumping, which modes present an effective index greater than the index of the outer cladding 5 towards the outer cladding 5 or through the peripheral segment 4.

In an optional embodiment, in order to further reduce the effective index of the peripheral segment 4, the walls 42 are made of glass containing boron or glass containing fluorine instead being made of silica. Walls 42 of glass containing boron or glass containing fluorine create stresses that present the advantage of increasing coupling between modes, but that also present the drawback of weakening the structure, thereby increasing the risk of breakage.

In another optional embodiment, in order to further decrease the effective index in the peripheral segment 4, the air cavities 41 are disposed in a plurality of ranks, and the walls 42 of some of said air cavities 41 situated towards the periphery of the optical fiber are preferably made of plastics material.

Preferably, the walls 42 present thickness that is radially constant. Thus, mode leakage towards the outer cladding 5 is decreased. With walls 42 that become wider with increasing distance from the center of the optical fiber, the effective index of the peripheral segment 4 increases with distance from the center of the optical fiber instead of remaining constant. Such an increase of index tending to rise to the index of the outer cladding 5 encourages modes to leak into the outer cladding 5. In contrast, by maintaining a low effective index over the entire peripheral segment 4, it is possible to guide the modes better and thus to decrease losses by leakage. Changing the material of the walls 42 towards the periphery of the optical fiber in order to decrease effective index can also compensate the increase in said effective index associated with an increase in the thickness of the walls 42.

The presence of large air cavities 41 in the peripheral segment 4 decreases the effective index, and in particular the minimum effective index $n_4$ of the peripheral segment 4, and thus increases the index difference between the multimode core and the peripheral segment 4, thus directly increasing the numerical aperture of the optical fiber at the pump wavelength. The presence of large air cavities 41 greatly increases the numerical aperture of the optical fiber as a function of wavelength (when the wavelength increases), whereas in the absence of such air cavities 41, the numerical aperture of the optical fiber decreases slightly as a function of wavelength (when the wavelength increases). Preferably, the minimum effective index $n_4$ is small enough to ensure that the numerical aperture of the optical fiber at the pump wavelength is greater than 0.3. Preferably, the minimum effective index $n_4$ is small enough for the numerical aperture of the optical fiber at the pump wavelength to be greater than 0.45. Preferably, the minimum effective index $n_4$ is less than 1.43 for a wavelength of 980 nm. Advantageously, the minimum effective index $n_4$ is less than 1.40 for a wavelength of 980 nm. Advantageously, the minimum effective index $n_4$ is less than 1.35 at a wavelength of 980 nm. Preferably, the minimum effective index $n_4$ is small enough to enable more than 1000 modes to be injected into the optical fiber at the pump wavelength.

Figure 3A:
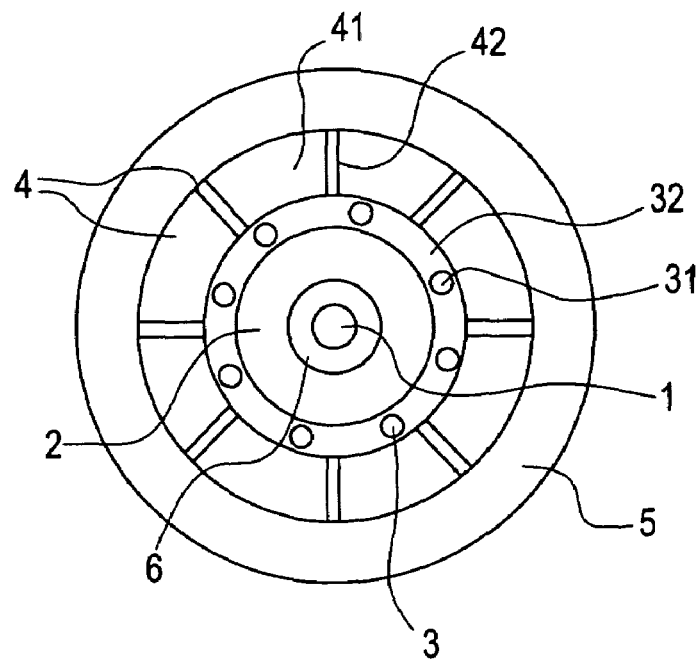
FIG. 3A is a diagrammatic view in section across the axis of the optical fiber, showing a preferred second embodiment of an amplifying optical fiber of the invention.

FIG. 3A is a diagrammatic view in section across the axis of the optical fiber showing an example of a preferred second embodiment of an amplifying optical fiber of the invention. In FIG. 3A, the amplifying optical fiber comprises, from the center of the optical fiber towards its periphery: a core 1 that is monomode at the signal wavelength band; a ring 6 doped with the rare earth; the major portion 2 of a core that is multimode at the pump wavelength, the multimode core also covering the monomode core 1 and the ring 6; a layer 3 essentially constituted by separating silica 32 and containing a minority of air cavities 31; a peripheral segment 4 essentially constituted by air cavities 41 separated from one another by silica walls 42; and outer cladding 5. The cavities 31 are smaller and preferably considerably smaller than the cavities 41. Because of this difference between them, and unless mentioned to the contrary, the cavities 31 are referred to below as "small" cavities, while the cavities 41 are referred to below as "large" cavities.

Figure 3B:
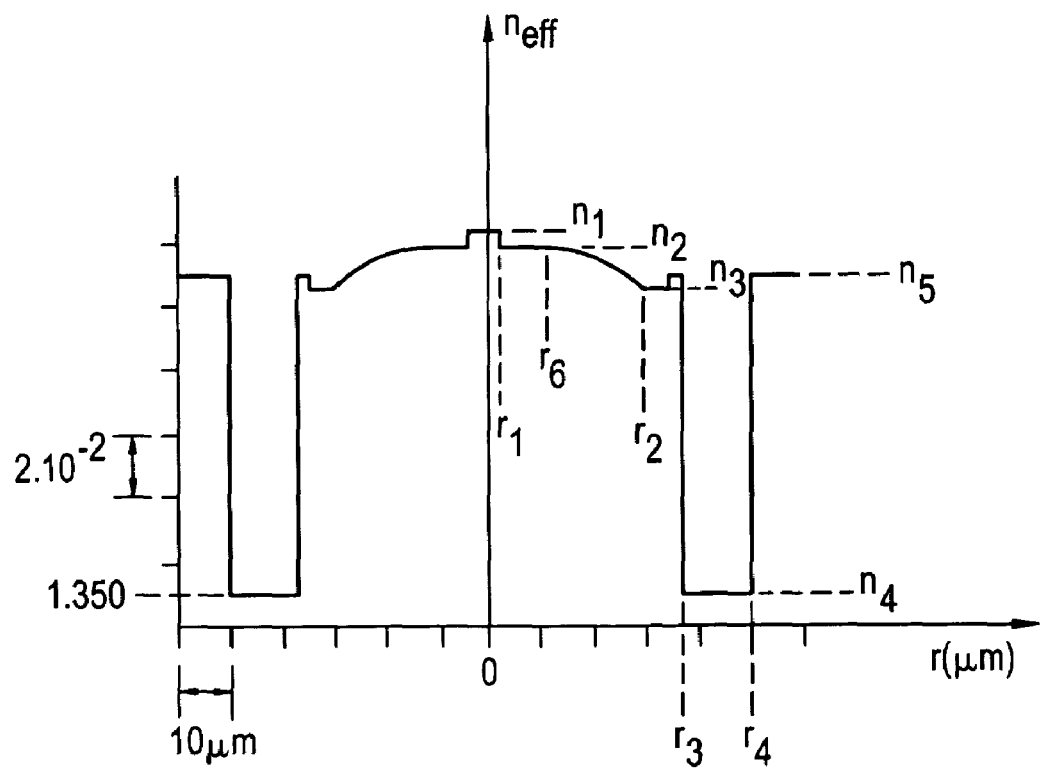
FIG. 3B is a diagram showing an example of index profile for a preferred second embodiment of an amplifying optical fiber of the invention.

FIG. 3B is a diagram showing an example of an index profile for a preferred second embodiment of an amplifying optical fiber of the invention. In FIG. 3B, the effective index profile $n_{eff}$ of the optical fiber is plotted as a function of radius r expressed in µm, abscissa point 0 representing the center of the optical fiber. From the center of the optical fiber to radius $r_1$, there extends the monomode core 1 of constant index $n_1$. From radius $r_1$ to radius $r_6$, there extends the ring 6 doped with rare earth and presenting constant index $n_2$ that is equal to the maximum index $n_2$ of the peripheral segment 2 that presents index in the form of a decreasing gradient. Between radius $r_6$ and radius $r_2$, there extends the major portion 2 of the multimode core presenting a maximum index $n_2$ and having index in the form of a decreasing gradient, the multimode core extending from the center of the optical fiber out to radius $r_2$. Between radius $r_2$ and radius $r_3$, there extends the peripheral segment 3 that is constituted essentially by separating silica containing a few small air cavities that are spaced apart from one another, the index profile of this peripheral segment 3 comprising, from the center of the optical fiber towards its periphery, firstly a small dip and secondly a small projection. Between radius $r_3$ and radius $r_4$ there extends the peripheral segment 4 that is constituted essentially by large air cavities, this peripheral segment 4 presenting a constant index $n_4$. Between the radius $r_4$ and a radius $r_5$ (not shown in FIG. 1B), there extends the outer cladding of constant index $n_5$. The maximum index $n_2$ is greater than the index $n_5$. The majority of the peripheral segment 2 presents an index greater than the index $n_5$. The modeling of the peripheral segments containing the small or large air cavities by means of an effective index is all the more valid when the disproportion between silica and air in these peripheral segments is great, which applies very well in the present case insofar as the peripheral segment 3 comprises much more silica than air and the peripheral segment 4 comprises much more air than silica.

The optical fiber preferably comprises a peripheral segment 3 of maximum effective index $n_3$ and radius $r_3$ where $n_2 > n_3 > n_4$ and $r_2 < r_3 < r_4$. The peripheral segment 3 of maximum effective index $n_3$ preferably presents an index that is constant, the peripheral segment 5 of maximum index $n_5$, i.e. the outer cladding 5, preferably presents an index that is constant, and the relationship $n_3 = n_5$ preferably applies.

The peripheral segment 3 of maximum effective index $n_3$ preferably presents longitudinal non-uniformities relative to the axis of the optical fiber so as to improve coupling between modes at the pump wavelength. These non-uniformities are preferably disposed at the outside and at the periphery of the multimode core so that the guided modes that contribute most to pumping and that are situated inside the multimode core do not see these defects. Preferably, at the pump wavelength, the longitudinal non-uniformities couple the energy of leakage modes either into the guided modes or else into leakage modes that present low losses. Said leakage modes, some of which tend to lie at least in part outside the multimode core, encounter the non-uniformities which couple a fraction of their energy to the guided modes that contribute most to pumping, since they present the greatest overlap with the zone doped with the rare earth, i.e. in FIGS. 2A and 3A, the ring 6, for example. In order to further improve the efficiency specific to the pumping of the guided modes as in the first embodiment, the preferred second embodiment recovers the unused energy of the leakage modes and transfers it to the guided modes whose energy is used more efficiently for pumping. Preferably, the longitudinal non-uniformities are air cavities 31 extending longitudinally relative to the axis of the optical fiber. Preferably, said air cavities 31 are distributed in an annular zone, which is the annular zone circumscribing the cavities 31 internally and externally, which is situated in the peripheral segment 3, but which does not necessarily occupy the entire peripheral segment 3, and which is situated around the center of the optical fiber, with said air cavities 31 occupying a minority of said annular zone, since the cavities 31 are widely spaced apart from one another.

Below, this paragraph gives characteristics that are advantageous for the index profile, improving certain properties of the amplifying optical fiber. The central segment 1 preferably presents an index that is constant. The peripheral segment 5 of maximum index $n_5$ preferably presents an index that is constant, and it is also referred to as outer cladding 5 in FIGS. 2A and 3A. The radius $r_2$ is preferably greater than 325 µm, being typically abut 30 µm, thereby ensuring that behavior is thoroughly multimode at the pump wavelength. The index difference between the central segment 1 and the outer cladding 5 preferably satisfies the relationship $n_1 - n_5 > 10 \times 10^{-3}$.

In the preferred second embodiment, as in FIG. 3B for example, the effective index profile of the optical fiber at the wavelength 1550 nm preferably presents in succession going from the center of the optical fiber towards its periphery: a constant zone; a sudden drop; a constant zone; a graded decrease; a small dip; a small projection; a sudden drop; a constant zone; a sudden increase; and a constant zone. The small dip and the small projection present an index amplitude and a radius extent that are smaller and indeed much smaller firstly, for index, than the sudden drops or rises, and secondly, for radius, than the constant zones and the decreasing graded zones.

What is claimed is:

1. An optical fiber,
   doped at least in part with a rare earth so as to be capable of transforming light energy at a pump wavelength into light energy over a signal wavelength band that does not include the pump wavelength,
   comprising in succession, from the center of the optical fiber towards its periphery:
   a central segment (1) of maximum index $n_1$ and of radius $r_1$;
   a peripheral segment (2) of maximum index $n_2$ and of radius $r_2$;
   a peripheral segment (4) of minimum effective index $n_4$ and of radius $r_4$; and
   a peripheral segment (5) of maximum index $n_5$ and of radius $r_5$;
   where $n_1 > n_2 > n_4$ and $n_5 > n_4$ and $r_1 < r_2 < n_4 < r_5$,
   the indices and the radii being determined in such a manner that:
   firstly, over the signal wavelength band, the optical fiber presents a monomode core extending from the center of the optical fiber to radius $r_1$; and
   secondly at the pump wavelength, the optical fiber presents a multimode core extending from the center of the optical fiber to radius $r_2$;
   the minimum effective index $n_4$ being small enough to ensure that the numerical aperture of the optical fiber at the pump wavelength is greater than 0.25,
   the optical fiber being characterized in that $n_2 > n_5$; and
   in that the peripheral segment (2) of maximum index $n_2$ presents a decreasing graded shape so as to recenter the light energy of at least some of the guided modes at the pump wavelength so as to increase overlap between said recentered guided modes and the portion (6) of the optical fiber which is doped with the rare earth.

2. An optical fiber according to claim 1, characterized in that the optical fiber includes a peripheral segment (3) of maximum effective index $n_3$ and of radius $r_3$ where $n_2>n_3>n_4$ and $r_2<r_3<r_4$.

3. An optical fiber according to claim 2, characterized in that the peripheral segment (3) of maximum effective index $n_3$ presents longitudinal non-uniformities (31) relative to the axis of the optical fiber so as to improve coupling between modes at the pump wavelength.

4. An optical fiber according to claim 3, characterized in that the longitudinal non-uniformities (31) are air cavities (31) extending longitudinally.

5. An optical fiber according to claim 4, characterized in that said air cavities (31) are distributed in an annular zone situated around the center of the optical fiber, and in that said air cavities occupy a minority of said annular zones.

6. An optical fiber according to claim 3, characterized in that at the pump wavelength the non-uniformities (31) couple the energy of leakage modes into guided modes.

7. An optical fiber according to claim 3, characterized in that at the pump wavelength, the longitudinal non-uniformities (31) couple the energy of the leakage modes into modes that are likewise leakage modes but that present reduced losses.

8. An optical fiber according to claim 2, characterized in that the peripheral segment (3) of maximum effective index $n_3$ presents an index that is constant, in that the peripheral segment (5) of maximum index $n_4$ presents an index that is constant, and in that $n_3=n_5$.

9. An optical fiber according to claim 1, characterized in that the peripheral segment (4) of minimum effective index $n_4$ includes air cavities (41) separated from one another by walls (42) and occupying the majority of said peripheral segment (4) of minimum effective index $n_4$.

10. An optical fiber according to claim 9, characterized in that the walls (42) are made of glass containing boron or glass containing fluorine.

11. An optical fiber according to claim 9, characterized in that the air cavities (41) are disposed in a plurality of ranks, and in that the walls (42) of some of said air cavities (41) situated towards the periphery of the optical fiber are made of plastics material.

12. An optical fiber according to claim 9, characterized in that the walls (42) present a thickness (e) that is radially constant over at least a given radial length.

13. An optical fiber according to claim 1, characterized in that the minimum effective index $n_4$ is less than 1.43 at a wavelength of 980 nm.

14. An optical fiber according to claim 13, characterized in that the minimum effective index $n_4$ is less than 1.40 at a wavelength of 980 nm.

15. An optical fiber according to claim 14, characterized in that the minimum effective index $n_4$ is less than 1.35 for a wavelength of 980 nm.

16. An optical fiber according to claim 1, characterized in that the minimum effective index $n_4$ is small enough to ensure that the numerical aperture of the optical fiber at the pump wavelength is greater than 0.3.

17. An optical fiber according to claim 16, characterized in that the minimum effective index $n_4$ is small enough to ensure that the numerical aperture of the optical fiber at the pump wavelength is greater than 0.45.

18. An optical fiber according to claim 1, characterized in that the portion (6) situated inside the peripheral segment (2) of maximum index $n_2$ but outside the central segment (1) of maximum index $n_1$ is doped with the rare earth.

19. An optical fiber according to claim 18, characterized in that said portion (6) doped with the rare earth extends at least from 3.5 μm to 5.5 μm from the center of the optical fiber.

20. An optical fiber according to claim 1, characterized in that the optical fiber is an amplifying optical fiber and in that the signal wavelength band extends from 1460 nm to 1650 nm.

21. An optical fiber according to claim 20, characterized in that the rare earth contains erbium.

22. An optical fiber according to claim 1, characterized in that the optical fiber is a laser-emitting optical fiber, and in that the signal wavelength band includes the wavelength of 1060 nm.

23. An optical fiber according to claim 22, characterized in that the rare earth contains ytterbium.

24. An optical fiber according to claim 1, characterized in that the peripheral segment (2) of maximum index $n_2$ presents a shape in α, with α<5.

25. An optical fiber according to claim 1, characterized in that the peripheral segment (2) of maximum index $n_2$ presents a shape in α, with α>2.

26. An optical fiber according to claim 1, characterized in that the peripheral segment (2) of maximum index $n_2$ presents a shape in α with α being about 3.

27. An optical fiber according to claim 1, characterized in that the central segment (1) presents an index that is constant.

28. An optical fiber according to claim 1, characterized in that the pump wavelength is 980 nm.

29. An optical fiber according to claim 1, characterized in that the peripheral segment (5) of maximum index $n_5$ presents an index that is constant.

30. An optical fiber according to claim 1, characterized in that the radius $r_2$ is greater than 25 μm.

31. An optical fiber according to claim 1, characterized in that the index profile of the optical fiber presents a horizontal level (6) situated between the central segment (1) and the peripheral segment (2) of maximum index $n_2$.

32. An optical fiber according to claim 1, characterized in that the effective minimum index $n_4$ is small enough to enable more than 1000 modes to be injected into the optical fiber at the pump wavelength.

33. An optical fiber according to claim 1, characterized in that the effective index profile of the optical fiber at the wavelength of 1550 nm presents, in succession from the center of the optical fiber towards its periphery: a constant zone; a sudden drop; a constant zone; a graded decrease; a small dip; a small projection; a sudden drop; a constant zone; a sudden rise; and a constant zone.

34. An optical fiber according to claim 1, characterized in that $n_1-n_5>10\times10^{-3}$.

* * * * *